Feb. 26, 1963  G. E. GARCIA  3,079,574
COMBINED MAGNETIC SUSPENSION AND ROTARY TRANSFORMER
Filed Jan. 6, 1960  2 Sheets-Sheet 1

INVENTOR.
GUSTAVO E. GARCIA
BY
ATTORNEYS

Feb. 26, 1963 G. E. GARCIA 3,079,574
COMBINED MAGNETIC SUSPENSION AND ROTARY TRANSFORMER
Filed Jan. 6, 1960 2 Sheets-Sheet 2
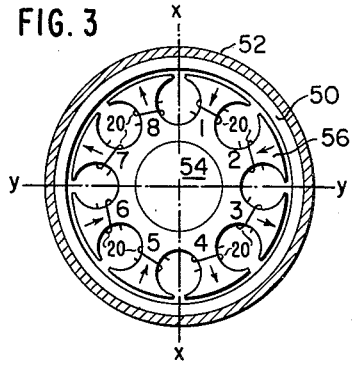
INVENTOR.
GUSTAVO E. GARCIA
BY
ATTORNEYS United States Patent Office 3,079,574
Patented Feb. 26, 1963

3,079,574
COMBINED MAGNETIC SUSPENSION AND
ROTARY TRANSFORMER
Gustavo E. Garcia, Natick, Mass., assignor to Research
Corporation, New York, N.Y., a corporation of New
York
Filed Jan. 6, 1960, Ser. No. 740
12 Claims. (Cl. 336—135)

The present invention relates to supports for rotating or oscillating members and more particularly to magnetic "bearings" for supporting such members without the use of conventional bearings.

Alternating current excited variable reluctance rotary transformers, of the type described generally in U.S. Patent No. 2,488,734 issued to R. K. Mueller, known as "microsyns," can be arranged to generate a phase directional signal voltage proportional to the rotor's angular displacement from a reference position. Mueller also describes the microsyn's function to produce a constant torque over the same angular range of movement as the signal generator or a torque whose magnitude is proportional to angular displacement dependent upon the type of excitation chosen.

This type of apparatus has been found to be particularly well adapted for use in the gyroscopic system disclosed in the Jarosh, Haskell and Dunnell Patent No. 2,752,791 issued July 3, 1956. In the Jarosh et al. patent there is a gyroscopic unit mounted within a cylindrical case which in turn is floated within an outer casing. The density of the float liquid is such as to buoy the inner case as freely as possible, and the clearance space between the outer casing and the inner case is very small, of the order of a few thousandths of an inch. The buoying liquid then acts as a damping medium so that the system functions as an integrating gyro. The inner casing is mounted on a shaft supported at its ends by conventional bearings and a microsyn signal generator is found at one end of the shaft while a microsyn torque generator is placed at the other end of the shaft. One object of the buoying fluid is to reduce the bearing load as much as possible but in certain applications requiring high precision, bearing friction may be excessive despite the liquid buoyancy.

To meet the bearing problem the patent application Ser. No. 659,395, filed May 15, 1957 by Philip J. Gilinson, Jr. for "Support for Oscillating or Rotating Members," and assigned to the same assignee as the present application, discloses the use of the microsyn structure of Mueller for the dual purpose of magnetic suspension and either signal or torque generation. From the disclosure of Gilinson it would appear that the actions of the microsyn with respect to rotary and radial displacement are completely independent and uncoupled. In a general sense a rotational movement of Gilinson's rotor generates either a torque or a signal as described by Mueller and a radial motion produces a restoring force to maintain the shaft in its proper centralized position. However, in the Gilinson device there are both primary and secondary windings on each stator pole. The interwinding capacitance between the two coils causes a flow of secondary current which in turn causes a reaction torque. The capacitance induced reaction torque in turn causes the angular position of the rotor at which reaction torque is null to differ from the position which is taken as the signal generator null.

The primary object of the present invention is to provide an improved magnetic suspension for rotating or oscillating members.

Another object of the invention is to provide a microsyn structure for the dual purpose of magnetic suspension and either signal or torque generation in which inherent reaction torque induced by inter-winding capacitance is minimized.

With these objects in view the present invention contemplates an entirely isolated inverted magnetic suspension which holds the rotor frictionless in the center and an outer microsyn structure which has very low reaction torque. The inverted magnetic suspension structure has wider poles and the flux path in the legs is shorter than in the normal microsyn structure and hence there is a tendency toward lower leakage flux and improved efficiency. To minimize inter-winding capacitance, the present invention employs a basic leg having three poles, the center pole and coil are the source of magnetomotive forces and the outside poles and windings are used for signal pick-off or torque generation. By the use of separate poles for the microsyn primary and secondary windings, this E-type microsyn has very little reaction torque.

These and other objects and features of the present invention will be apparent from the following description and drawing in which:

FIG. 3 is a diagram of the magnetomotive force pattern of the magnetic suspension stator of FIG. 2;

FIG. 4 is a diagram of winding connections;

FIG. 5 is a graph illustrating the operation of the device;

FIG. 6 is a diagram of the magnetomotive force pattern of the microsyn stator of FIG. 2.

Figure 1:
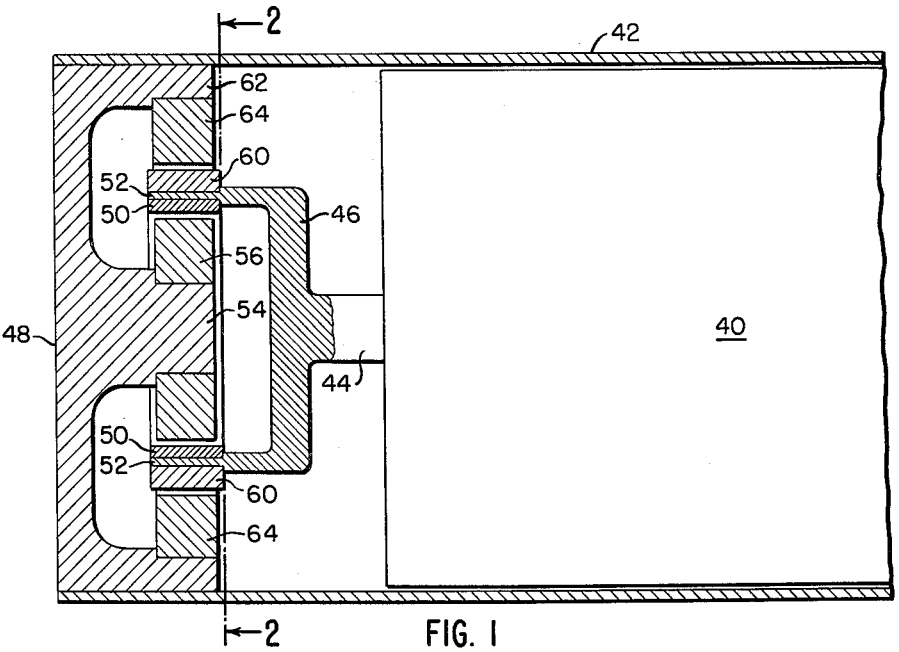
FIG. 1 is a cross-sectional view of a magnetic bearing according to the present invention.
Figure 2:
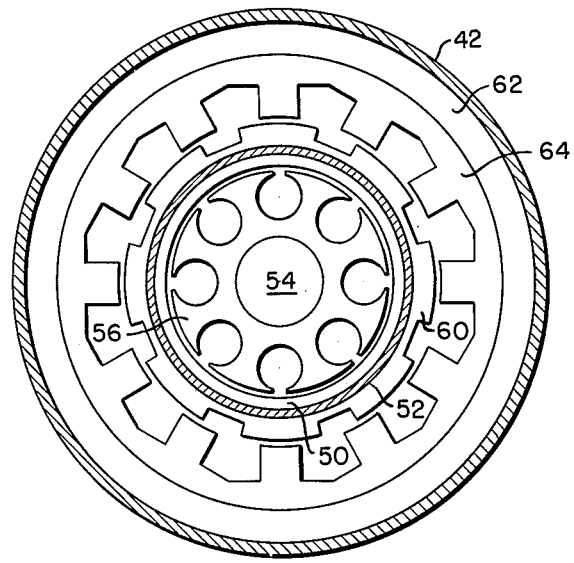
FIG. 2 is an end view taken along line 2—2 of FIG. 1.

With reference to FIGS. 1 and 2 a floated instrument 40 is contained within a casing 42, there being a slight clearance space between the parts 40 and 42 which is filled with a viscous floating and damping liquid (not shown in the interests of clarity) as described in the Jarosh et al. patent wherein the floated instrument is the inner case of the gyroscope. Since both ends of the apparatus are identical except for electrical connections, only one end need be described. Instrument 40 is attached to non-magnetic, cup-shaped rotor adaptor 46 by use of a shaft 44 or other means. Rotor adaptor 46 is machined in such a manner so as to provide support 52 for microsyn rotor 60 on its outer surface, and for the magnetic suspension rotor 50 on its inner surface, thus providing separate and independent magnetic paths for the magnetic suspension and microsyn stators. The use of two separate rotors is desirable though not necessary for suitable operation. It is thus possible to machine rotor adaptor 46 to adapt one rotor to be used by both stators.

Outer casing 42 is provided with end housing 48 which is formed with a central boss 54. Central boss 54 is machined to provide a support for the magnetic suspension stator 56. End housing 48 has a rim 62 the inner surface of which is machined to provide a support for microsyn stator 64. The air gap between stator 56 and rotor 50 may be made as narrow as 0.003 inch while the air gap between stator 64 and rotor 60 may be made somewhat wider or about 0.010 inch, although these suggested dimensions are not critical.

Referring now to FIG. 3, the end view of the bearing shows boss 54 on which is mounted the magnetic suspension stator 56. The stator 56 is formed from magnetic material to have eight salient poles designated by the numerals 1 to 8, respectively. Each pole has a coil 20. The showing of the coils in FIG. 3 is conventional and no effort is made to indicate direction of winding or number of turns. The coils are preferably energized to produce alternately inward and outward instantaneous fluxes in consecutive poles as indicated by the arrows in FIG. 3. Rotor 50 is cylindrical.

A schematic diagram of the connections is given in

FIG. 4. The windings are numbered 1 to 8 to correspond to the pole around which they are wound. The windings are connected in series pairs and each pair is connected in series with a condenser C. The four coil-condenser series circuits are connected in parallel with each other and a voltage source V. The series condenser C is of such a magnitude that the operating point of each RLC circuit of FIG. 4 is on the down slope of the resonance curve so that an increase of inductance of any coil results in a decrease of current in that coil. A plot of current against inductance is given in FIG. 5.

If rotor 50 is exactly centered, there is no net magnetic force tending to move the rotor in any direction. The circuit parameters are such that any slight displacement of rotor 50 away from its center position results in a net magnetic force which restores it to its center position. When the rotor 50 is centered the inductance of any coil has a value $L_0$ and the current in any coil is $I_0$.

In order to examine the conditions existing upon a radial displacement, let it be assumed that the rotor 50 is displaced from its center position slightly along the $x$ axis, which is shown in FIG. 3 as lying symmetrically between the centers of poles 1 and 8 and extending between poles 4 and 5. Let the air gaps at 1 and 8 decrease and the air gaps at 4 and 5 increase. The inductance of coils 1 and 8 has increased, say to L+ on FIG. 5, while the inductance of coils 4 and 5 has decreased to L—. As a consequence the current flow through coils 1 and 8 is reduced and the current flow through coils 4 and 5 is increased.

The magnetic energy in the air gap due to any coil is $\frac{1}{2}Li^2$ and the magnetic force acting on the rotor due to that coil is the derivative of energy with respect to displacement. The changes in the coil inductances upon the occurrence of a small displacement may be computed from the changes in the air gap reluctance and in turn the changes of current may be calculated from the changes in inductance so that an analytic determination of the resultant force may be obtained. Generally speaking, the center position of the rotor is a position of minimum energy, and the axis of the rotor is centralized as a result of the tendency of the system to assume the position of minimum energy.

The same considerations apply to displacement of the rotor 50 along the $y$ axis of FIG. 3. In like manner they apply to any components of displacement which takes place along the $x$ and $y$ axes and therefore to a displacement in any direction. In other words, any slight displacement from the symmetrical central position of rotor 50 results in a force which acts to restore rotor 50 to its central position. The magnitude of the centralizing force depends upon the size of the rotor and stator, the magnitude of the current $I_0$, the reluctance of the air gap, frequency of the voltage source V, and the like circuit parameters.

The suspension may be stiffened by the use of feedback circuits which amplify the current changes and hence increase the centralizing forces according to techniques well known in the art. The incorporation of high-pass filters and low-pass filters in the feedback circuits improves the stability of the system and reduces long-term errors.

In the system thus far described there is no provision for restraint along the axis of shaft 44. In other words the system lacks axial restraint. Conventional thrust bearings, not shown in the drawing, may be used for this purpose. The above-mentioned patent application of Gilinson discloses the use of tapered rotors whereby the same centralizing forces that provide radial centralization also provide axial restraint.

In the magnetic suspension described above there will be some tendency to radial oscillation. The rotor and shaft will tend to oscillate at a frequency determined by the mass of the suspended elements and the stiffness of the magnetic suspension. The required damping of radial motion is readily secured when the present invention is used in connection with the floated damped instruments of the type described in the afore-mentioned Jarosh et al. patent since the buoying liquid will serve to damp any radial oscillation.

The inverted magnetic suspension has improved efficiency because the poles are wide and the flux path in the legs is short and hence this structure has low leakage flux. The improved efficiency allows better suspension stiffness with lower excitation and allows wider tolerance of capacitor value. Since the stator and rotor are both circular, the manufacturing process requires only that the grinding of the surfaces shall be as nearly round as possible.

Referring now to FIG. 6, the E-type rotary transformer is shown separate from the rest of the structure in the interest of clarity. Stator 64 is shown to have twelve salient poles arranged in four groups of 3 poles each. The center pole of each basic leg is identified by the letter P while the adjacent poles are labeled $S_1$ and $S_2$ respectively. It will be understood that each pole has a coil wound thereon although coils 66 are shown on the poles of only one of the E-type legs. The coils on the primary poles P are energized from a common source, not shown in FIG. 6, in such manner that the instantaneous flux is in the same direction for all of the primary poles. The coils on the secondary poles are all connected in series so that the voltages induced in the $S_1$ coils oppose the voltages induced in the $S_2$ coils.

If at a given instant the flux in each primary pole may be said to pass from the stator into the rotor across the air gap, the flux pattern is such that the flux leaves the rotor across the gap to the secondary poles and the path is completed through the outer rim of the stator.

The rotor 60 is slotted to form eight protruding poles, each spanning a greater circular arc than the stator poles. In its null position rotor 60 is so located with respect to stator 64 that each primary pole P is opposed by the full surface of a rotor pole whereas each secondary pole $S_1$ is opposed by a rotor pole which spans the distance from the center line of pole $S_1$ to the center line of the adjacent secondary pole $S_2$. With the primary coils energized, the voltages induced in the secondary coils of poles $S_1$ and $S_2$ will be equal and opposed so that there will be a null output voltage.

The rotor 60 may also be slotted to form four protruding poles. Each rotor pole spanning the stator from the center line of pole $S_1$ to the center line of the next non-adjacent outer pole $S_2$. In its null position rotor 60 is so located with respect to the stator 64 such that the center line of the rotor pole lines up with the center line of the primary pole P, and the rotor pole spans the stator from the center line of pole $S_1$ continuous through the primary pole to the center line of pole $S_2$. With the primary coils energized, the voltages induced in the secondary coils of poles $S_1$ and $S_2$ will be equal and opposed so that there will be a null output voltage.

Assuming that rotor 60 is rotated from its null position through a slight angle in a clockwise direction, the reluctance of the air gap at secondary pole $S_1$ is decreased and the reluctance of the air gap at secondary pole $S_2$ is increased while there is no change in reluctance at the primary pole air gap. The total flux path remains constant. Thus the considerations for uniform total flux in the torque generator or signal generator of the above-mentioned Mueller patent are satisfied. Since the coils are in series, the introduce of the entire secondary winding is a constant regardless of the position of the rotor. However, the mutual inductance between primary and secondary windings changes with displacement of rotor 60 from its neutral position. Consequently, the secondary winding can be energized to generate a torque, or an output signal proportional to displacement and phase sensitive to direction of rotation of the rotor can be taken from the secondary in the same manner as taught in the Mueller patent.

From the description thus far it is readily seen that the structure of FIGS. 1 and 2 isolates the magnetic circuits which provide the radial centering action of the rotor from the magnetic circuits affected by rotation to yield either torque or signal generation. As a consequence of the separation of the function of magnetic suspension from the function of signal or torque generation, it is possible to make the bearing so that the small air gap, high energy magnetic suspension stator contains a round rotor having no discontinuities. This allows high values of magnetic support with less reaction torque than is otherwise possible. Also it is possible, due to this isolation of magnetic circuits, to energize the signal and torque generators with low energy excitation to minimize reaction torque. The signal or torque generator units need not be as described above, though the E-type structure is preferred due to the fact that it allows a fairly large air gap without causing extreme non-linear energy changes in the poles which in turn allows rotor poles which need not be specially contoured. With the need for specially contoured rotors removed, machining complications are avoided to the extent that the only requirement is to obtain rotor and stator contours as nearly round as possible. The relatively large air gap provides for a very low signal generator output due to radial displacement of the rotor.

Having thus described my invention, I claim:

1. A variable reluctance alternating current rotary transformer comprising a stator of magnetic material having a plurality of salient poles arranged in at least two groups of three poles, a coil wound on each of said poles, a first circuit energizing the coils wound on the central pole of each group of three, a second circuit interconnecting the coils wound on the outer poles of each group of three so that the voltage induced in one outer coil bucks the voltage induced in the other outer coil of each group, a rotatable shaft, a hollow cup shaped rotor of material terminating said shaft and supported within said stator by said shaft, said rotor having an inner magnetic ring isolated magnetically from an outer ring, said outer ring being slotted to provide two protruding poles for each group of three stator poles, said rotor having a neutral position wherein alternate rotor poles span the center line distance between adjacent stator outer poles, said first and second circuits thereby have substantially constant self-inductance and a mutual inductance proportional to the rotary displacement of said rotor from said neutral position, and magnetic means mounted within said hollow rotor to support said shaft.

2. A variable reluctance alternating current rotary transformer comprising a stator of magnetic material having a plurality of salient poles arranged in at least two groups of three poles, a coil wound on each of said poles, a first circuit energizing the coils wound on the central pole of each group of three, a second circuit interconnecting the coils wound on the outer poles of each group of three so that the voltage induced in one outer coil bucks the voltage induced in the other outer coil of each group, a rotatable shaft, a hollow cup shaped rotor of material terminating said shaft and supported within said stator by said shaft, said rotor having an inner magnetic ring isolated magnetically from an outer ring, said outer ring being slotted to provide one protruding pole for each group of three stator poles, said rotor having a neutral position wherein the center line of each of said rotor poles is aligned with the center line of said central pole of an opposed three pole group of said stator, each rotor pole spanning continuously the distance between the center lines of said outer poles of said opposed three pole group of stator poles, said first and second circuits thereby having substantially constant self-inductance and a mutual inductance proportional to the rotary displacement of said rotor from said neutral position, and magnetic means mounted within said hollow rotor to support said shaft.

3. A variable reluctance alternating current rotary transformer comprising a stator of magnetic material having a plurality of salient poles arranged in at least two groups of three poles, a coil wound on each of said poles, a first circuit energizing the coils wound on the central pole of each group of three, a second circuit interconnecting the coils wound on the outer poles of each group of three so that one outer coil bucks the other outer coil of each group, a rotatable shaft, a hollow rotor of magnetic material supported within said stator by said shaft, said rotor being slotted at its outer surface to provide two protruding poles for each group of three stator poles, said rotor having a neutral position wherein alternate rotor poles span the center line distance between adjacent stator outer poles, said first and second circuits thereby have substantially constant self-inductance and a mutual inductance proportional to the rotary displacement of said rotor from said neutral position, a second stator having a plurality of pairs of salient poles mounted within said hollow rotor, a coil wound on each pole of said second stator, and means to energize said second stator coils through a resonant circuit operating in a region where decrease of coil inductance increases coil current whereby a centralizing force is applied to said rotor upon radial displacement thereof to provide a magnetic bearing suspension for said shaft.

4. A variable reluctance alternating current rotary transformer comprising a stator of magnetic material having a plurality of salient poles arranged in at least two groups of three poles, a coil wound on each of said poles, a first circuit energizing the coils wound on the central pole of each group of three, a second circuit interconnecting the coils wound on the outer poles of each group of three so that one outer coil bucks the other outer coil of each group, a rotatable shaft, a hollow rotor of magnetic material supported within said stator by said shaft, said rotor being slotted at its outer surface to provide one protruding pole for each group of three stator poles, said rotor having a neutral position wherein each rotor pole continuously spans the distance beween the center line of one outside pole of an opposed group of three stator poles to the center line of the second outer pole of said opposed group of three stator poles, and second circuits thereby have substantially constant self-inductance and a mutual inductance proportional to the rotary displacement of said rotor from said neutral position, a second stator having a plurality of pairs of salient poles mounted within said hollow rotor, a coil wound on each pole of said second stator, and means to energize said second stator coils through a resonant circuit operating in a region where decrease of coil inductance increases coil current whereby a centralizing force is applied to said rotor upon radial displacement thereof to provide a magnetic bearing suspension for said shaft.

5. The apparatus of claim 3 wherein said hollow rotor is composed of an inner magnetic ring and an outer magnetic ring isolated magnetically from each other by a non-magnetic support mounted on said shaft.

6. The apparatus of claim 4 wherein said hollow rotor is composed of an inner magnetic ring and an outer magnetic ring isolated magnetically from each other by a non-magnetic support mounted on said shaft.

7. A composite magnetic bearing suspension and variable reluctance alternating current rotary transformer comprising a rotatable shaft, a cup shaped rotor terminating said shaft, said rotor having an inner magnetic ring isolated magnetically from an outer magnetic ring, a first stator of magnetic material having a plurality of salient poles supported in coaxial relationship within said inner ring, a coil wound on each of said poles, means to energize said coils through a resonant circuit thereby to apply a centralizing force on said rotor, a second stator of magnetic material having a plurality of basic legs consisting of three salient poles each, said second stator supported in coaxial relationship with said outer magnetic ring, said outer magnetic ring being slotted to provide two protruding poles for each of said second stator basic legs, said outer magnetic ring possessing a neutral position with respect to said second stator in which the central pole of each group of three stator poles is opposed by a rotor pole and each outer pole shares a rotor pole equal with an adjacent outer pole, a first circuit energizing each coil on each central pole, a second circuit interconnecting the coils on said outer poles to form a winding having substantially constant self inductance, the mutual inductance between said first and second circuits being substantially linearly proportional to the rotary displacement of said outer magnetic ring from said neutral position.

8. A composite magnetic bearing suspension and variable reluctance alternating current rotary transformer comprising a rotatable shaft, a cup shaped rotor terminating said shaft, said rotor having an inner magnetic ring isolated magnetically from an outer magnetic ring, a first stator of magnetic material having a plurality of salient poles supported in coaxial relationship within said inner ring, a coil wound on each of said poles, means to energize said coils through a resonant circuit thereby to apply a centralizing force on said rotor, a second stator of magnetic material having a plurality of basic legs consisting of three salient poles each, said second stator supported in coaxial relationship with said outer magnetic ring, said outer magnetic ring being slotted to provide one protruding pole for each group of three stator poles, said rotor having a neutral position wherein each rotor pole continuously spans the distance between the center line of one outside pole of an opposed group of three stator poles to the center line of the second outer pole of said opposed group of three stator poles, a first circuit energizing each coil on each central pole, a second circuit interconnecting the coils on said outer poles to form a winding having substantially constant self inductance, the mutual inductance between said first and second circuits being substantially linearly proportional to the rotary displacement of said outer magnetic ring from said neutral position.

9. A composite magnetic bearing suspension and variable reluctance alternating curent rotary transformer comprising inner and outer spaced concentric stators of magnetic material, each of said stators having a plurality of salient poles, each of said poles having a coil wound thereon, a rotatable shaft, first and second concentric magnetic rotors supported by said shaft between said inner and outer stators, said first rotor being magnetically isolated from said second rotor and adapted to coact with said inner stator, said second rotor being in operative relationship with said outer stator, means to energize said coils on said inner stator poles through a resonant circuit operating in the region wherein an increase of coil inductance results in a decrease of coil current whereby a centralizing force is exerted on said shaft upon radial deviation thereof, said outer stator having at least two basic legs consisting of three poles, said second rotor having two protruding poles for each of said basic legs, the neutral position of said second rotor causing one of said protruding poles to be opposite the central pole of each leg, the second of said protruding poles spanning the distance between center lines of adjacent outside poles, means to energize said coils on said central poles to produce a magnetomotive force pattern in said second rotor and said outer stator, and means to interconnect said coils on said outside poles to form a circuit having substantially constant self-inductance, the mutual inductance between said coils on said outside poles and said coils on said central poles being substantially proportional to the displacement of said second rotor from said neutral position.

10. A composite magnetic bearing suspension and variable reluctance alternating current rotary transformer comprising inner and outer spaced concentric stators of magnetic material, each of said stators having a plurality of salient poles, each of said poles having a coil wound thereon, a rotatable shaft, first and second concentric magnetic rotors supported by said shaft between said inner and outer stators, said first rotor being magnetically isolated from said second rotor and adapted to coact with said inner stator, said second rotor being in operative relationship with said outer stator, means to energize said coils on said inner stator poles through a resonant circuit operating in the region wherein an increase of coil inductance results in a decrease of coil current whereby a centralizing force is exerted on said shaft upon radial deviation thereof, said outer stator having at least two basic legs consisting of three poles, said second rotor having one protruding pole for each of said basic legs, the neutral position of said second rotor causing each rotor pole to span continuously the distance between the center lines of the two outside poles of an opposed basic leg of three stator poles, coils on said central poles to produce a magnetomotive force pattern in said second rotor and said outer stator, and means to interconnect said coils on said outside poles to form a circuit having substantially constant self-inductance, the mutual inductance between said coils on said outside poles and said coils on said central poles being substantially proportional to the displacement of said second rotor from said neutral position.

11. A composite magnetic bearing and variable reluctance alternating current rotary transformer comprising inner and outer spaced concentric stators of magnetic material, each of said stators having a plurality of salient poles, each of said poles having a coil wound thereon, a rotatable shaft, first and second concentric magnetic rotors supported by said shaft, said first rotor being magnetically isolated from said second rotor and adapted to coact with said inner stator, said second rotor being in operative relationship with said outer stator, means to energize said coils on said inner stator poles through a resonant circuit operating in a region wherein an increase of coil inductance results in a decrease of coil current whereby a centralizing magnetic force is exerted on said first rotor upon radial deviation thereof, said outer stator and said second rotor forming a rotary transformer possessing substantially constant self inductance and a variable mutual inductance proportional to the rotary displacement of said second rotor from a neutral position.

12. A composite magnetic bearing and variable reluctance alternating current rotary transformer comprising inner and outer spaced concentric stators of magnetic material, each of said stators having a plurality of salient poles, each of said poles having a coil wound thereon, a rotatable shaft, a cylindrical hollow rotor of magnetic material supported by said shaft between said inner and outer stators, means to energize said coils on said inner stator poles through a resonant circuit operating in a region wherein increase of coil inductance decreases coil current whereby a centralizing magnetic force is exerted on said rotor upon radial deviation of said shaft, said outer stator and said rotor forming a rotary transformer possessing substantially constant self-inductance and a variable mutual inductance proportional to the rotary displacement of said rotor.

References Cited in the file of this patent

UNITED STATES PATENTS 2,564,484    Kuchni  ---------------- Aug. 14, 1951